Feb. 8, 1966    J. A. GIORDMAINE ET AL    3,234,475
EFFICIENT OPTICAL HARMONIC GENERATION, PARAMETRIC
AMPLIFICATION, OSCILLATION AND MODULATION
Filed Dec. 11, 1961    2 Sheets-Sheet 1
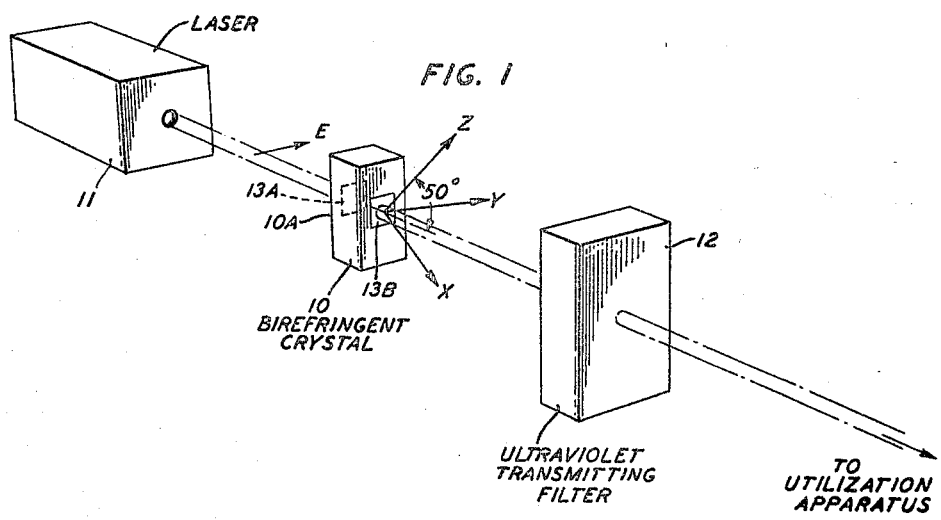
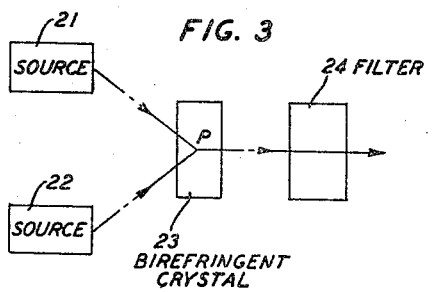
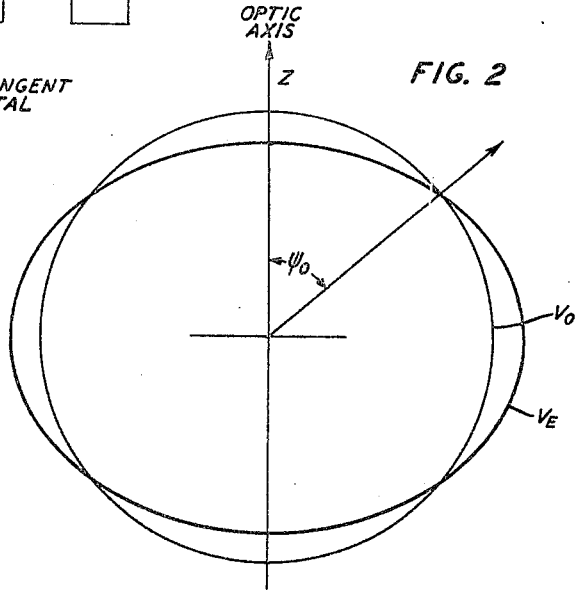
INVENTORS J. A. GIORDMAINE
D. A. KLEINMAN
BY
AT TORNEY

INVENTORS J. A. GIORDMAINE
D. A. KLEINMAN
BY
ATTORNEY

3,234,475
EFFICIENT OPTICAL HARMONIC GENERATION, PARAMETRIC AMPLIFICATION, OSCILLATION AND MODULATION
Joseph A. Giordmaine, Millington, and David A. Kleinman, Plainfield, N.J., assignors to Bell Telephone Laboratories Incorporated, New York, N.Y., a corporation of New York
Filed Dec. 11, 1961, Ser. No. 158,267
4 Claims. (Cl. 330—4.6)

This invention relates to the generation and amplification of electromagnetic waves whose wavelength is less than one centimeter.

It will be convenient hereinafter to discuss the invention with particular reference to electromagnetic waves of light frequencies, but it is to be understood that the principles similarly are applicable to longer wavelengths, such as wavelengths in the microwave range.

The harmonic generation of coherent light has recently been reported in the literature. Such generation involved focusing coherent red light supplied as the output of a ruby laser on a quartz crystal for inducing the emission of ultraviolet light. Harmonic generation in this way is inefficient. A major obstacle is the disparity in the phase velocities of propagation in the quartz of the applied light and the induced light. As a result of this disparity, if light is induced over an extended path, the light induced does not all add in appropriate phase and the resulting interference reduces the efficiency of the conversion process. Moreover, as a result of this low efficiency, it becomes necessary to utilize focused beams to achieve the required high intensities and such focusing tends to limit the conversion process to the region surrounding the focal point.

The present invention is based on our discovery that by an appropriate choice of crystal as the nonlinear element and by appropriate choice of the direction therethrough of the applied light, the induced light may be made to add cumulatively in appropriate phase over an extended path whereby a larger output and a higher efficiency are possible. For the practice of the invention, the crystal chosen should not have a center of symmetry; it should have a suitably large nonlinear polarizability to serve effectively as the nonlinear element; it should be sufficienly birefringent with respect to its dispersion at the frequencies of interest; it should have a sufficiently low absorption at the frequencies of interest; and advantageously, it should be sufficiently convenient to make. It will be convenient to designate hereinafter such a crystal simply as a suitable birefringent crystal.

By way of example, for the harmonic generation of ultraviolet light from applied red light, a crystal of potassium dihydrogen phosphate (KDP) meets each of the desiderata set out above. In particular, in such a negatively uniaxial crystal the direction of propagation of the applied red light can be chosen so that the phase velocity of propagation of the applied ordinary wave matches that of the extraordinary wave of the induced ultraviolet light.

More generally, the invention is based on the principle that by appropriate choice of crystal and direction, the wave of polarization set up by one or more interacting electromagnetic waves and having the frequency of the wave to be induced can be matched in phase velocity with the induced wave whereby the efficiency of generation of the induced wave is enhanced.

Accordingly, a feature of the invention is the use as a nonlinear element of a suitable birefringent crystal chosen to have a direction in which the phase velocity of propagation of one ray of the light of which a modulation product is desired matches the phase velocity of propagation of the opposite ray of the desired modulation product. In this way, the wave of polarization of the desired output frequency set up by the applied light can be kept in phase with the induced wave of the desired output frequency through the crystal whereby the efficiency of the desired conversion process can be maximized.

In a preferred embodiment, the applied beam is the coherent output of a ruby laser and the active element is a potassium dihydrogen phosphate crystal. The red light of the ruby laser is directed through the crystal as the ordinary ray at approximately a 50° angle to its optic axis. Advantageously, this light is in a plane containing the optic axis (the z axis) and bisecting the x and y axes of the crystal, since for this choice of azimuth about the z axis, the maximum nonlinear polarization is produced. As a result, coherent ultraviolet light having a wavelength one half that of the red light from the laser is generated and made available as the output.

The invention will be better understood from the following more detailed description taken in connection with the accompanying drawings, in which:

FIG. 1 shows schematically the basic elements of a second harmonic generator in accordance with the invention;

FIG. 2 is a graph depicting polar coordinates useful in the explanation of the invention;

FIG. 3 shows schematically an arrangement for mixing two light beams in accordance with the invention;

Figure 4:
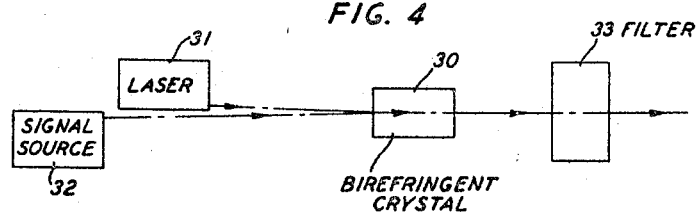
FIG. 4 shows a parametric amplifier in accordance with the invention.

With reference now to the drawings, the harmonic generator of FIG. 1 comprises as the nonlinear medium a crystal 10 of potassium dihydrogen phosphate. Such a crystal is birefringent and is negatively uniaxial, i.e. at a given wavelength the velocity of the ordinary ray is smaller than that of the extraordinary ray. However, the crystal is also normally dispersive in the optical region, i.e. the velocity of propagation of light therethrough decreases as the frequency is increased. Typically, the crystal 10 has a substantially rectangular parallelepiped configuration, 2 x 1 x 1 centimeters. The optic axis of the crystal is represented as the z axis in the x, y, z rectangular coordinate system shown. In accordance with the invention, the crystal is cut so that an ordinary ray normal to the surface 10A on which the applied light is to be incident makes approximately a 50° angle with the optic axis. Additionally, the projection of such ray on the xy plane should also make a 45° angle with each of the x and y axes.

As indicated by the vector E, the pumping light, of which the second harmonic is to be generated, is polarized light with the electric field perpendicular to the z axis and is applied normal to the crystal face 10A from a ruby laser 11 of the kind now familiar to workers in the art. In the interest of simplicity, the details of the laser have not been shown. However, typically, this comprises a ruby rod silvered at its two ends, a source of exciting radiation and a filter transmitting only the desired coherent light. As is known, a ruby laser of this kind provides a well collimated, high intensity, substantially monochromatic coherent beam having a wavelength of approximately 6940 Angstrom units.

As a result of such application, the crystal generates ultraviolet light having a wavelength of approximately 3470 Angstrom units corresponding to the second harmonic of the applied light.

Typically, it will be advantageous to include a filter 12 designed to transmit therethrough only the ultraviolet light, filtering out the red light, whereby the beam available for utilization consists only of the ultraviolet light.

The principles of operation of this embodiment can best be understood from reference to FIG. 2 which is a plot in polar coordinates in two dimensions of the phase velocities of the ordinary ray $V_o$ of the red light and the extraordinary ray $V_e$ of the ultraviolet light as functions of the direction of propagation. In the two dimension graph depicted, there are four points of intersection corresponding to the directions for which the two velocities are equal. In three dimensions, the directions for which the two velocities are equal define a pair of circular cones symmetric about the optic axis. As discussed above, for a KDP crystal and the wavelengths involved, such points of intersection correspond to a direction making approximately a 50° angle with the optic axis.

If desired, at some sacrifice in added complexity, the efficiency of the interaction can be increased by enclosing the crystal 10 in an appropriate Fabry-Perot etalon to provide a cavity resonant at the wavelength of the applied light whereby such light is effectively trapped for multiple reflections through the crystal. Typically, as shown, such an etalon comprises a pair of elements 13A, 13B, highly reflective of energy of the wavelength to be trapped and appropriately separated for the build-up of energy of such wavelength within the space enclosed.

The general principles described can be utilized to improve the mixing of two coherent light waves to provide either their sum or difference frequency. In this instance, the two light waves to be mixed are made incident on the crystal which is to serve as the mixing element in such directions that the resultant wave of polarization of the desired modulation product will match the velocity of one ray of the light induced by such wave of the desired modulation frequency. The matching condition is that the propagation vectors of the waves to be mixed have a vector sum equal to the propagation vector of the product wave. The propagation vector associated with a wave is defined as a vector having the direction of wave propagation and magnitude equal to the inverse wavelength.

FIG. 3 is a schematic representation of such a modulation arrangement. Sources 21 and 22 provide separate light beams which are directed at the suitable birefringent crystal 23 which serves as the mixing element. The direction each of these beams makes with the optic axis of the crystal and the crystal itself are chosen such that the velocity of the wave of polarization resulting in the crystal, shown by P, matches the velocity of a ray of the induced light of the desired modulation frequency along this direction. Either the sum or difference modulation product can be selected by matching the velocity of the corresponding wave. A filter 24 can be included on the output side of the crystal to transmit selectively the desired modulation product, filtering out any of the light initially applied. As a special case, each of the sources can supply light of the same frequency in which case the second harmonic can be generated.

The principles of the invention can be further extended to parametric amplification and generation. For parametric amplification a laser beam acts as the pump and a second beam which is the signal is passed through the crystal, preferably although not necessarily in the same direction as the laser beam. As is characteristic of the parametric amplification process, a third beam called the idler is generated in the crystal by the mixing of the pump and signal. The sum of the signal and idler frequencies equals the pump frequency. In passing through the crystal both the signal and idler are amplified by transfer of power from the pump. For efficient amplification, the propagation vector of the pump should equal the sum of the propagation vectors of the signal and idler. In isotropic crystals or crystals with inadequate birefringence this condition cannot be satisfied owing to dispersion.

Figure 6:
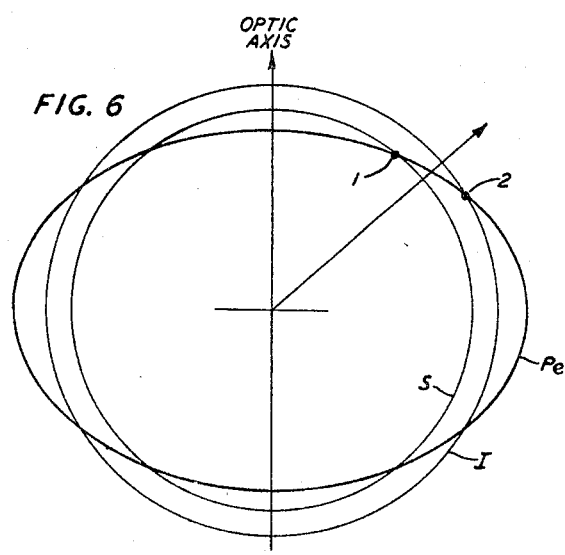
FIG. 6 is a graph useful in explaining the principles of the amplifier shown in FIG. 4.

The principles of the invention as they apply to parametric amplification are best understood from reference to FIG. 6, which is a plot of phase velocities as a function of propagation direction similar to FIG. 2. In FIG. 6, however, the pump is assumed to be an extraordinary ray having the curve labeled $P_e$. The curves S and I represent the signal and idler, respectively, as ordinary rays. The plot refers to a negatively uniaxial crystal with normal dispersion, and to the case where the signal frequency is somewhat higher than the idler frequency. Ordinarily, the signal will be introduced in the same direction as the pump and at approximately half the pump frequency. The optimum direction for the pump and signal is then indicated by the arrow in FIG. 6. This direction lies between intersection points "1" and "2," and is uniquely determined by the signal frequency, the pump frequency, and the curves of FIG. 6. In practice, the intersection points "1" and "2" would be very close together. If the signal and pump waves are not introduced in the same direction, the same principles apply to define the optimum conditions.

The basic elements of a parametric amplifier of this kind are shown in FIG. 4. A suitable birefringent crystal 30 chosen in accordance with the principles described serves as the nonlinear mixing element. The pumping light is provided by the laser source 31 and the signal light to be amplified is provided by signal source 32. In some instances, an optical system (not shown) would be utilized to provide that the signal and pumping waves are introduced for exact superposed travel in the same direction in the crystal. The filter 33 is used to select for utilization the desired output frequency. This can be either the signal or idler frequency.

Figure 5:
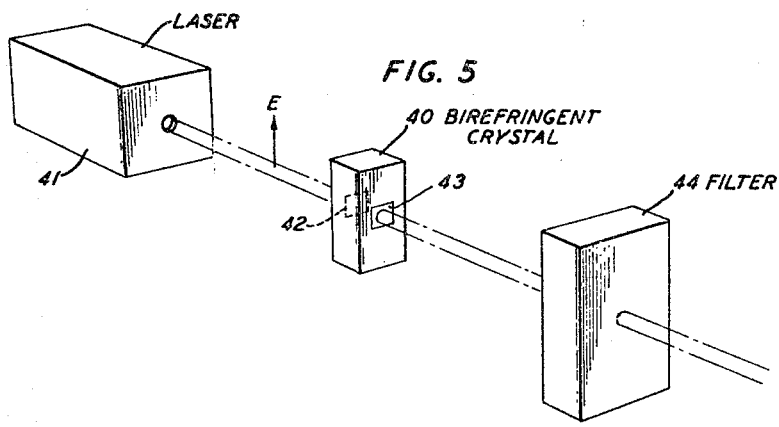
FIG. 5 shows schematically a system for the generation of subharmonics of applied light.

By providing sufficient parametric amplification and by inclusion of an optical cavity resonant at a desired output frequency and at the resulting idler frequency, generation of such frequency can be achieved. There is shown in FIG. 5 an arrangement suitable for the parametric generation of a light of a frequency lower than that of the applied or pumping light. The birefringent crystal 40 is irradiated with pumping light having the polarization E shown from the laser source 41. The direction of the light through the crystal and the choice of crystal are made in accordance with the principles described. Advantageously, to provide a cavity resonant at the desired frequencies, reflective elements are provided on opposite sides of the cavity along the path of the pumping light. Advantageously, such elements take the form of reflecting coatings 42, 43, on opposite surfaces of the crystal to form a Fabry-Perot etalon in the manner known to workers in the art to establish standing waves in the crystal. There are advantageously established standing waves at the pump, the idler and the desired output frequency. A filter 44 is provided to limit the passage of all but the desired output frequency. This arrangement is particularly well adapted for generating the first subharmonic of the pump frequency corresponding to the frequency at which the idler and the output frequencies are each equal to one half the pump frequency, since the parametric conversion process is most efficient when this relationship is met.

The principles of the invention have been discussed with reference to an example of each of harmonic generation, modulation, parametric amplification and parametric generation. It should be evident that the specific embodiments are merely illustrative of the general principles and that other embodiments may be devised within the spirit of the invention. For example, a variety of other crystals can be utilized provided that for the wavelengths of interest the crystal exhibits a direction along which the desired velocity conditions are satisfied. As previously indicated, suitable positive birefringent crystals can be used in which case the extraordinary ray of the light of lower frequency is matched to the ordinary ray of light of higher frequency. Additionally, various refinements are possible. In particular, the wave to be used for excitation of the crystal may first be passed through a polarizer to insure that energy of only the desired useful polarization is actually applied to the crystal. Additionally, surface treatments may be used on the crystal to facilitate the entry of applied light and the egress without undue scattering of the generated light including appropriately shaping the faces at which light enters and exits. The optics may be designed to maximize the collection and collimation or focusing of the exiting generated light.

Moreover, as indicated earlier, the same principles are applicable even to electromagnetic radiation of wavelengths longer than those of light, such as microwaves.

What is claimed is:

1. In combination, means supplying coherent input electromagnetic radiation, a substantially nonlinear, birefringent, noncentrosymmetric, low loss crystal having an optic axis and a direction along which the wave of polarization at the desired output frequency set up by said input radiation has a phase velocity substantially equal to the phase velocity of an induced wave of the desired frequency, said crystal being positioned to receive said input radiation along said direction, said radiation having a substantial E vector component normal to said optic axis, and means for abstracting for utilization an output of the desired frequency.

2. Apparatus for generating modulation products of applied coherent input light having given propagation vectors associated therewith comprising means supplying said input light, a substantially nonlinear birefringent, noncentrosymmetric, low loss crystal having a direction along which at the frequency of a desired modulation product the phase velocity of a wave of polarization within said crystal matches the phase velocity of a ray of the desired modulation product induced by said wave of polarization, said crystal being positioned for the travel therein of said light along said direction, said propagation vectors having a vector sum equal to the propagation vector of said desired product, and means for abstracting for utilization the desired modulation product.

3. Apparatus for the generation of a harmonic of coherent light of a supplied wavelength comprising a supply source of coherent light of said wavelength, a substantially nonlinear, birefringent, noncentrosymmetric, low loss crystal having an optic axis and a direction along which rays of light of the supplied wavelength have a phase velocity substantially equal to that of the opposite ray of light of the wavelength to be generated, said source of light being disposed to shine said light through said crystal along said direction, said light having a substantial E vector component normal to said optic axis, and means for deriving for utilization the generated light.

4. Apparatus for generating ultraviolet light from red light comprising a source of coherent red light, a KDP crystal positioned to that the red light from said source passes through it in a direction which makes approximately a 50° angle with the optic axis of the crystal, said light having a substantial E vector component normal to said axis, and means for deriving for utilization the ultraviolet light generated.

References Cited by the Examiner
UNITED STATES PATENTS
2,929,922  3/1960   Schawlow _____ 250—83.3
3,602,959  11/1962  Sclar _____ 250—83.3

OTHER REFERENCES

"Lasers and Applications," edited by Chang, Ohio State University at Columbus, 1963, pages 192–201 (article by Hsu et al.).

Electronics Newsletter, Electronics, vol. 34, No. 34, Aug. 25, 1961, page 11.

Franken et al., Generation of Optical Harmonics, Physical Review Letters, vol. 7, No. 4, Aug. 15, 1961, pages 118 and 119.

Giordmaine, "Physical Review Letters," Jan. 1, 1962, pages 19–20.

ROY LAKE, *Primary Examiner.*

RALPH G. NILSON, *Examiner.*